(12) United States Patent
Oshita et al.

(10) Patent No.: US 7,229,382 B2
(45) Date of Patent: Jun. 12, 2007

(54) INPUT TORQUE CONTROL SYSTEM OF BELT-TYPE CONTINUOUSLY VARIABLE TRANSMISSION FOR VEHICLE

(75) Inventors: Hideki Oshita, Fuji (JP); Hiroyasu Tanaka, Fuji (JP); Takuichiro Inoue, Fuji (JP); Aki Hayakawa, Fuji (JP)

(73) Assignee: Jatco Ltd (JP)

( * ) Notice: Subject to any disclaimer, the term of this patent is extended or adjusted under 35 U.S.C. 154(b) by 254 days.

(21) Appl. No.: 11/092,044

(22) Filed: Mar. 29, 2005

(65) Prior Publication Data
US 2005/0221929 A1    Oct. 6, 2005

(30) Foreign Application Priority Data
Mar. 31, 2004    (JP)    .............................. 2004-108198

(51) Int. Cl.
*F16H 61/00* (2006.01)
(52) U.S. Cl. .......................................... 477/44; 701/51
(58) Field of Classification Search ...................... None
See application file for complete search history.

(56) References Cited
U.S. PATENT DOCUMENTS
7,006,908 B2    2/2006    Kang et al.

| 7,029,410 B2 | 4/2006 | Sawada et al. |
| 7,065,441 B2 * | 6/2006 | Yamamoto et al. ........... 701/51 |
| 2004/0133318 A1 | 7/2004 | Kang et al. |
| 2004/0171444 A1 * | 9/2004 | Yamamoto et al. ........... 474/28 |
| 2004/0209719 A1 | 10/2004 | Ochiai et al. |
| 2005/0192153 A1 | 9/2005 | Jozaki et al. |

OTHER PUBLICATIONS

Specification and Claims of related co-pending U.S. Appl. No. 11/092,037.
Specification and Claims of related co-pending U.S. Appl. No. 11/092,537.

* cited by examiner

*Primary Examiner*—Charles A. Marmor
*Assistant Examiner*—Derek D. Knight
(74) *Attorney, Agent, or Firm*—Rossi, Kimms & McDowell LLP

(57) ABSTRACT

An input torque control system is provided with a primary pulley, a secondary pulley, a V belt wound between these pulleys, a step motor to change a pressure difference between the primary pulley pressure and the secondary pulley pressure to change a gear ratio of the transmission, a memory unit to store pulley information immediately before a vehicle stop, and a torque restricting section. When an initialization operation of the step motor is started without pulley information stored in the memory unit, an output torque of the engine is restricted, and the restriction is removed after the initialization operation is finished.

6 Claims, 4 Drawing Sheets

INPUT TORQUE CONTROL SYSTEM OF BELT-TYPE CONTINUOUSLY VARIABLE TRANSMISSION FOR VEHICLE

BACKGROUND OF THE INVENTION

1. Field of the Invention

The present invention relates to an input torque control system of belt-type continuously variable transmission for vehicle to control an input torque inputted in a belt-type continuously variable transmission.

2. Description of the Prior Art

A continuously variable transmission suitable for a vehicle includes a V belt-type continuously variable transmission using a V belt. Generally, in the continuously variable transmission a hydraulic pressure (hereinafter referred to as a primary pulley pressure) is supplied to a cylinder chamber of a primary pulley thereof. The primary pulley pressure is generated by regulating a line pressure as an original pressure with a shift control valve, and is increased or reduced with the shift control valve to change a groove width of the primary pulley. As a result a diameter ratio of the primary pulley to a secondary pulley is changed, thereby to continuously control a gear ratio of a vehicle such as an automobile.

The shift control valve is, for example, connected near the middle of a shift link which constitutes a mechanical feedback mechanism, and one end of the shift link is connected to a movable flange of the primary pulley while the other end is connected to a step motor of a shift actuator.

An initialization operation of the step motor is performed as needed while a vehicle is stopped, for example when an engine is started so that an occurrence of a mismatch between a command value to the step motor and an operating position of the step motor to make the shift control valve travel at a position corresponding to a desired shift command value is prevented.

According to an example of an initialization operation of the step motor in the related apparatus as described above, after the step motor is moved to a hardware limit position in one direction when an ignition switch is on, the step motor is moved back to a reference position in the other direction, and then when the initialization operation of the step motor is finished, the command value to the step motor is initialized as a reference position. Thereby, it is aimed to make a command value to the step motor to correspond to a motor operating position with high accuracy, so that an accurate shift control is performed.

In this apparatus, when the initialization operation of the step motor is performed, it is necessary to actuate the step motor from the present position thereof to the hardware limit position in one direction, and therefore, a continuously variable transmission is provided with a transmission controller having a memory unit therein capable of storing a present operating position of the step motor, a pulley ratio and the like as pulley information. Moreover, the memory unit is equipped with a backup power supply to input data, and when a power supply (ignition switch) of a vehicle is turned off, the memory unit stores the pulley information with power supplied from the backup power supply.

An example of such an apparatus is shown in Japanese Patent Laid-Open Publication No. 08-178063.

SUMMARY OF THE INVENTION

The related apparatus described above, however, may fail to store pulley information in a memory unit, for instance when the memory unit can not write or fail to write pulley information therein because of a defect of the backup power supply.

In such a case, the present position of the step motor is unclear, and when the motor is moved to a hardware limit position in one direction in an initialization operation of the step motor, an operating position of the motor is assumed to be the farthest from the hardware limit position, and therefore, the step motor is actuated for as long as the time required in which the motor is moved from the assumed motor operating position to the hardware limit position.

During the initialization of the step motor as described above, the step motor is moved to the hardware limit position in one direction, that is, to a direction such that a pulley ratio becomes the lowest, and therefore, the primary pulley pressure is communicated with a drain side to be reduced. In this condition, when a driver depresses an accelerator pedal, there is a possibility that a belt may be slipped due to a lack of the primary pulley pressure to reduce durability of the belt.

In view of the above, there exists a need for an input torque control system of belt-type continuously variable transmission for vehicle which overcomes the above-mentioned problems in the related art. The present invention addresses this need in the related art and also other needs, which will become apparent to those skilled in the art from this disclosure.

It is therefore an object of the present invention, in view of the foregoing problems, to provide an input torque control system of belt-type continuously variable transmission for vehicle capable of ensuring power performance of a vehicle as well as preventing a belt slip of a pulley when a driver depresses an accelerator pedal during an initialization operation of a step motor in a case where pulley information is not stored in a memory unit.

According to one aspect of the present invention, an input torque control system of belt-type continuously variable transmission for vehicle comprises: a primary pulley to which an input torque is inputted; a secondary pulley located on an output side of the transmission; a belt wound between the primary pulley and the secondary pulley; and a shift actuator to change a pressure difference between a primary pulley pressure exerting on the primary pulley and a secondary pulley pressure exerting on the secondary pulley generated with a line pressure as an original pressure, thereby to change a gear ratio of the transmission. The shift actuator is set in an operating position corresponding to a target gear ratio to change the pressure difference, so that a groove width of each of both the pulleys changes to cause an actual gear ratio obtained by a speed ratio of the primary pulley to the secondary pulley to be the target ratio. And the input torque control system further comprises: a memory unit to store pulley information immediately before the stop of a vehicle; a memory judgment section to judge whether or not the pulley information is stored in the memory unit; a torque restricting section to restrict the input torque; and a primary pulley pressure sensor to detect the primary pulley pressure, wherein the torque restricting section restricts the input torque when the memory judgment section judges that the pulley information is not stored in the memory unit before an initialization operation of setting the shift actuator in a reference position is performed; and the torque restricting section removes the restriction of the input torque when the primary pulley pressure sensor detects that the primary pulley pressure is above a predetermined value after the initialization operation of the shift actuator is finished.

According to the present invention, when pulley information has not been stored in the memory unit before an initialization operation of the shift actuator is performed, an input torque to the primary pulley is restricted, and when the primary pulley pressure has increased after finishing the initialization operation of the shift actuator and the primary pulley pressure sensor detects that the primary pulley pressure is above a predetermined value, the restriction of an input torque to the primary pulley is removed.

Upon this, even if the accelerator pedal is depressed during the initialization operation of the shift actuator in which an adequate primary pulley pressure has not been established, the V belt wound between the primary pulley and the secondary pulley has no slip because of the restriction of an input torque to the primary pulley.

Furthermore, after the initialization operation of the shift actuator is finished, restricting input torque to the primary pulley is removed, whereby acceleration performance of a vehicle can be improved.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will be explained with reference to the drawings.

Figure 1:
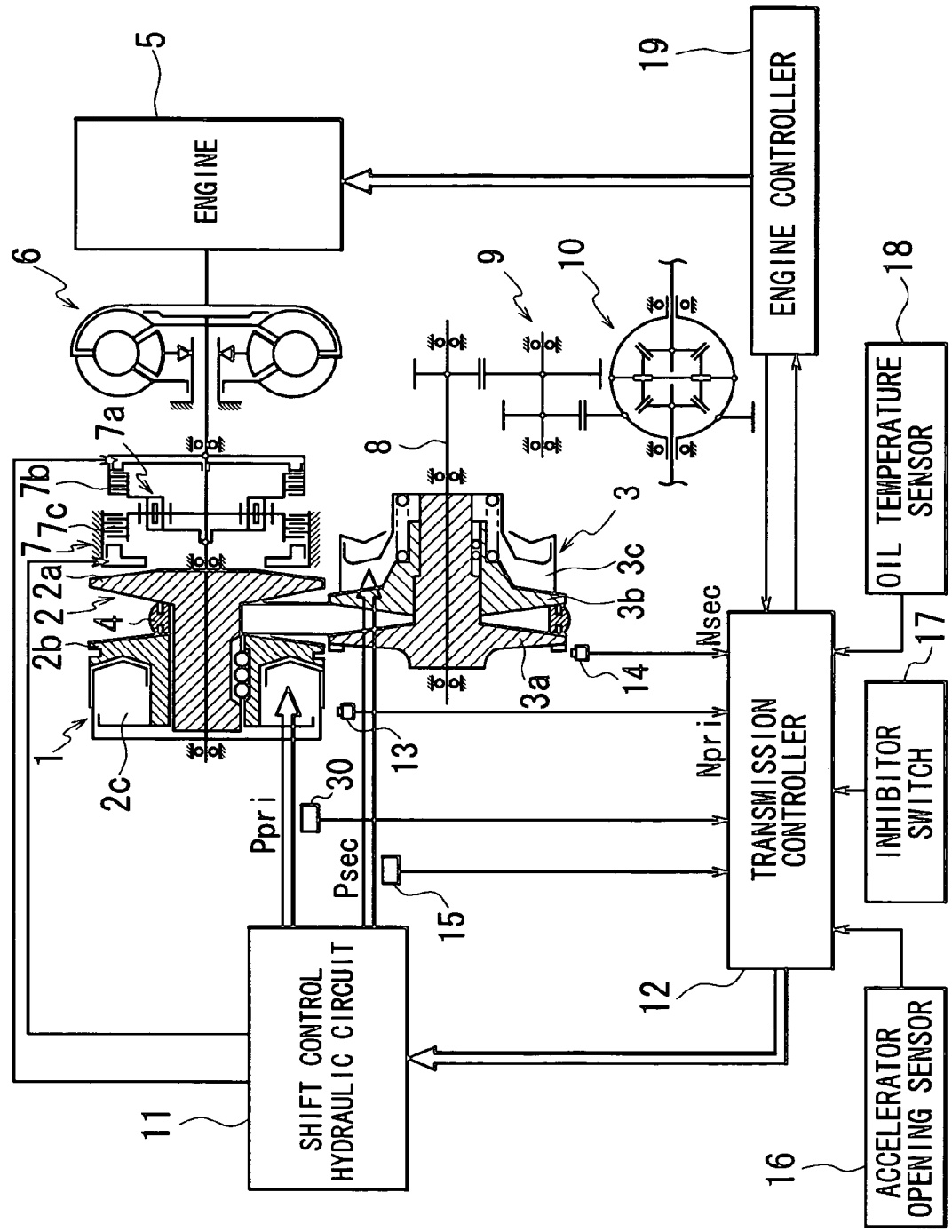
FIG. 1 is a view showing a preferred embodiment of the present invention.

FIG. 1 is a schematic view illustrating a structure of a V belt-type continuously variable transmission.

A primary pulley 2 and a secondary pulley 3 are located such that V grooves of both the pulleys are arrayed in line, and a V belt 4 is wound between the V grooves of these pulleys 2, 3. An engine 5 which is a driving source is located co-axial with the primary pulley 2, and a torque converter 6 with a lockup mechanism and a forward/reverse switching mechanism 7 are provided in the order thereof between the engine 5 and the primary pulley 2. The V belt-type continuously variable transmission 1 comprises the torque converter 6, the forward/reverse switching mechanism 7, the primary pulley 2, the secondary pulley 3 and the V belt 4.

The forward/reverse switching mechanism 7 comprises a double-pinion planetary gear unit 7a as a main component, a sun gear thereof connected to the engine 5 via the torque converter 6, and a carrier connected to the primary pulley 2. The forward/reverse switching mechanism 7 further comprises a forward clutch 7b directly connecting between the sun gear of the double-pinion planetary gear unit 7a and the carrier, and a reverse brake 7c fastening a ring gear, and transmits an input rotation with no change of rotation from the engine 5 via the torque converter 6 to the primary pulley 2 when the forward clutch 7b is engaged. When the reverse brake 7c is engaged, an input rotation via the torque converter 6 from the engine 5 is reversed and reduced to be transmitted to the primary pulley 2.

The rotation of the primary pulley 2 is transmitted to the secondary pulley 3 via the V belt 4, and the rotation of the secondary pulley 3 is subsequently transmitted to wheels not shown in the figure via an output shaft 8, a gear unit 9 and a differential gear 10.

One of flanges forming V grooves of the primary pulley 2 and the secondary pulley 3 is a fixed flange 2a and 3a, and the other of flanges is a movable flange 2b and 3b capable of moving in the axial direction, so that it is possible to change a rotation transmission ratio (gear ratio) between the primary pulley 2 and the secondary pulley 3 during the transmission of the power described above. Each of the movable flanges 2b, 3b is urged against the side of each of the fixed flanges 2a, 3a by supplying a primary pulley pressure Ppri and a secondary pulley pressure Psec generated with a line pressure to be described below in detail as an original pressure respectively to a primary pulley chamber 2c and a secondary pulley chamber 3c, and the V belt 4 is engaged in friction between the fixed flange 2a and the movable flange 2b and between the fixed flange 3a and the movable flange 3b, thereby to enable the power transmission between the primary pulley 2 and the secondary pulley 3.

It should be noted that especially in the preferred embodiment of the present invention, a pressure area of the primary pulley chamber 2c and a pressure area of the secondary pulley chamber 3c are same each other, so that one of the diameters of the pulleys 2, 3 is not larger than the other, thereby reducing the size of the V belt-type continuously variable transmission.

Furthermore, in a shift, a pressure difference between the primary pulley pressure Ppri and the secondary pulley pressure Psec generated corresponding to a target gear ratio as described below causes a V groove width of each of the both pulleys 2, 3 to be changed, and as a result a winding circular diameter of the V belt 4 to these pulleys 2, 3 is continuously changed, thereby to realize a target gear ratio.

An output of the primary pulley pressure Ppri and the secondary pulley pressure Psec is controlled together with an output of an engagement oil pressure of the forward clutch 7b, which should be engaged in selecting a forward drive range and an output of an engagement oil pressure of the reverse brake 7c, which should be engaged in selecting a reverse drive range, by a shift control hydraulic circuit 11, which performs the above control in response to a signal from a transmission controller 12.

To the transmission controller 12, therefore, are inputted a signal from a primary pulley rotation sensor 13 to detect a primary pulley rotation speed Npri, a signal from a secondary pulley rotation sensor 14 to detect a secondary pulley rotation speed Nsec, a signal from a secondary pulley pressure sensor 15 to detect a secondary pulley pressure Psec, a signal from an accelerator opening sensor 16 to detect an depression amount APO of an accelerator pedal, a selected range signal from an inhibitor switch 17, a signal from an oil temperature sensor 18 to detect a temperature TMP of a transmission hydraulic oil, and signals (such as an engine rotation speed and a fuel injection time) relating to a transmission input torque from an engine controller 19 for controlling the engine 5.

Further, the transmission controller 12 receives a signal from a primary pulley pressure sensor 30 to detect a primary pulley pressure Ppri.

Next, controls performed in the shift control hydraulic circuit 11 and the transmission controller 12 will be explained with reference to FIG. 2.

The shift control hydraulic circuit 11 is provided with an oil pump 21 driven by the engine, and a pressure of an oil which acts as a medium from the oil pump 21 to an oil passage 22, is regulated to a predetermined line pressure PL by a pressure regulator valve 23. A line pressure PL of the oil passage 22 is, on the one hand, regulated by a pressure reducing valve 24 to be supplied as a secondary pulley pressure Psec to the secondary pulley chamber (SEC) 3c, and on the other hand, regulated by a shift control valve 25 to be supplied as a primary pulley pressure Ppri to the primary pulley chamber (PRI) 2c. It should be noted that the pressure regulator valve 23 controls the line pressure PL with a driving duty to a solenoid 23a, while the pressure reducing valve 24 controls the secondary pulley pressure Psec with a driving duty to a solenoid 24a.

The shift control valve 25 has a neutral position 25a, a pressure increasing position 25b, and a pressure reducing position 25c, and in order to change these valve positions, the shift control valve 25 is connected in the middle of a shift link 26, and one end of the shift link 26 is connected to a step motor (M) 27 as a shift actuator while the other end thereof is connected to the movable flange 2b of the primary pulley. The step motor 27 is driven from a reference position to an operating position where the step motor 27 moves by the number of steps corresponding to a target gear ratio, and by driving the step motor 27 in such a way, the shift link 26 pivots around the connecting point with the movable flange 2b as a fulcrum, so that the shift control valve 25 is changed from the neutral position 25a to the pressure increasing position 25b or the pressure reducing position 25c.

As a result, when a target gear ratio is high (upshift side), a line pressure PL is communicated with a primary pulley pressure Ppri side, while the primary pulley pressure Ppri is communicated with a drain side when the target gear ratio is low (downshift side). Therefore, the primary pulley pressure Ppri is increased using a line pressure PL as an original pressure or reduced by draining, changing a pressure difference between the primary pulley pressure Ppri and the secondary pulley pressure Psec, and thereby generating an upshift to a higher gear ratio or a downshift to a lower gear ratio to perform a shift operation toward a target gear ratio.

The process of the shift mentioned above is fed back to the shift link 26 via the movable flange 2b of the primary pulley, and the shift link 26 pivots around a connecting point with the step motor 27 as a fulcrum, which causes the shift control valve 25 to be returned back from the pressure increasing position 25b or the pressure reducing position 25c to the neutral position 25a. Therefore, when a target gear ratio is achieved, the shift control valve 25 is set back to the neutral position 25a so that the target gear ratio can be maintained. When a pulley is set at the lowest position, it is supposed that a mechanical stopper not shown in the figure provides a reaction force to the pulley despite the presence or absence of the primary pulley pressure Ppri and therefore a capacity of a transmission torque of the V belt 4 is ensured.

The transmission controller 12 determines solenoid driving duty of the pressure regulator valve 23, solenoid driving duty of the pressure reducing valve 24, and a shift command (the number of steps) to the step motor 27, as well as whether or not an engagement oil pressure to the forward clutch 7b and the reverse brake 7c as shown in FIG. 1 is supplied.

Figure 2:
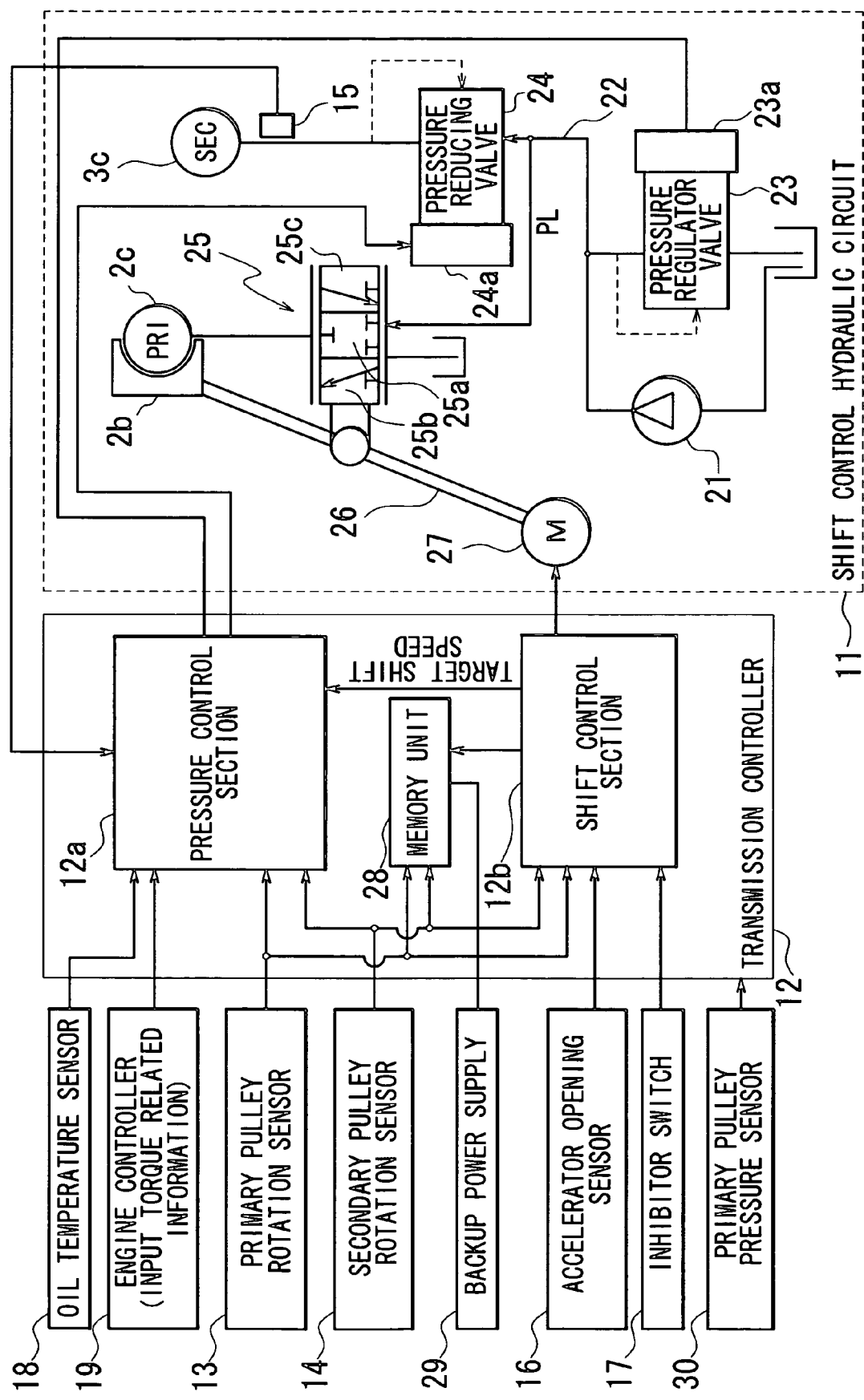
FIG. 2 is a view showing a detail of a transmission control system of a V belt-type continuously variable transmission.

The transmission controller 12 comprises a pressure control section 12a and a shift control section 12b as shown in FIG. 2. The pressure control section 12a determines solenoid driving duty of the pressure regulator valve 23 and solenoid driving duty of the pressure reducing valve 24, and the shift control section 12b determines the number of driving steps Astep of the step motor 27 as follows.

The shift control section 12b, first obtains a target input rotation speed based on a predetermined shift map with the use of a vehicle speed obtainable from a secondary pulley rotation speed Nsec and the accelerator pedal opening APO, and the obtained target input rotation speed is divided by the secondary pulley rotation speed Nsec, thereby to obtain a target gear ratio in response to an operating condition (a vehicle speed and an accelerator pedal opening APO).

Next, a primary pulley rotation speed Npri is divided by the secondary pulley rotation speed Nsec to calculate an actual gear ratio (an attained gear ratio), and a gear ratio command to asymptotically approximate the actual gear ratio to the target gear ratio at a target shift speed is obtained, compensating for a disturbance corresponding to a deviation of the actual gear ratio to the above-mentioned target gear ratio. Then, the number of steps (an operating position of the step motor 27) Astep of the step motor 27 is obtained to realize the gear ratio command, and the obtained number of steps is commanded to the step motor 27 so that a target gear ratio can be achieved with the shift operations mentioned above.

Further, the transmission controller 12 is provided with a memory unit 28 to store a value of an actual gear ratio obtained by a rotation speed Npri of the primary pulley 2 and a rotation speed Nsec of the secondary pulley 3 inputted respectively from the primary pulley rotation sensor 13 and the secondary pulley rotation sensor 14, and furthermore, to store an operating position of the step motor 27 commanded to the step motor 27 by the shift control section 12b. Additionally, the memory unit 28 is connected to a backup power supply 29, and even when a power supply of the vehicle is turned off, the memory unit 28 is supplied with power by the backup power supply 29, so that the memory unit 28 stores as pulley information an actual gear ratio, and an operating position of the step motor 27 or the like at the time when the power supply of the vehicle is turned off.

Then, a control of each section performed by the transmission controller 12 is described with reference to FIG. 3 and FIG. 4.

Figure 3:
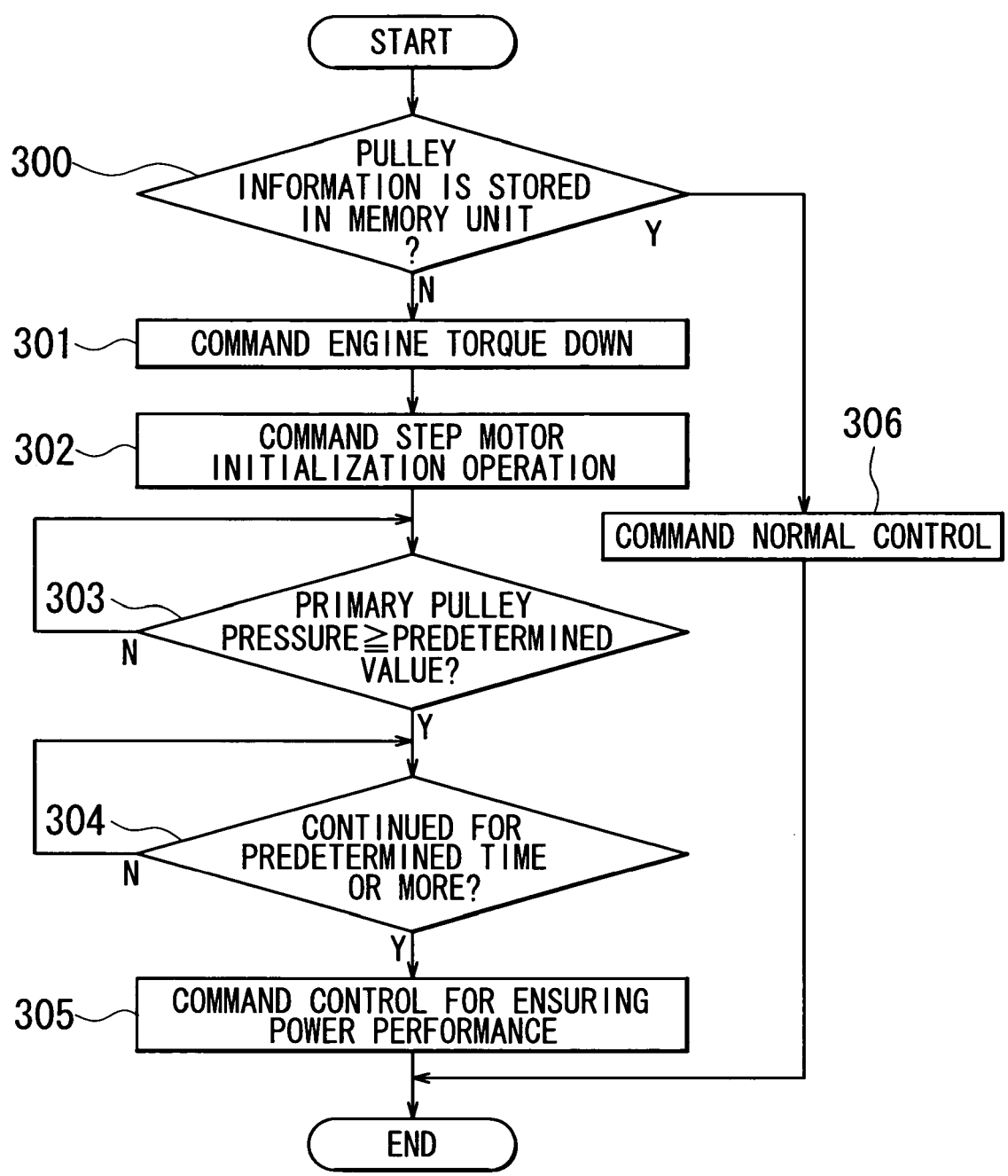
FIG. 3 is a flow chart illustrating a process performed by a transmission controller.
Figure 4:
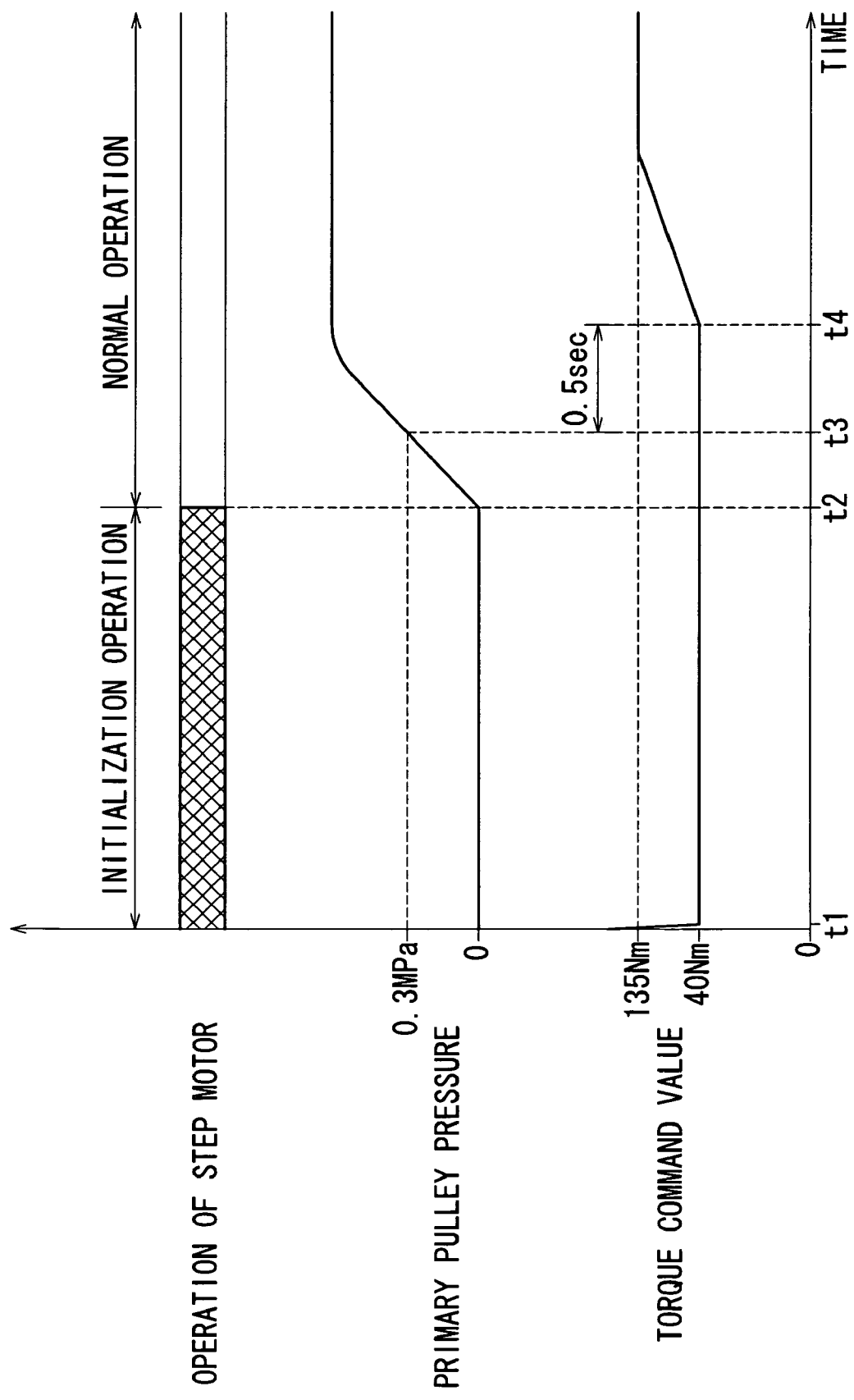
FIG. 4 is a time chart illustrating changes of a primary pulley pressure and a torque command value.

FIG. 3 is a flow chart illustrating a process performed by the transmission controller 12, and FIG. 4 is a time chart in this control.

It should be noted that this process is started when an ignition switch is on.

When the ignition switch is on, the transmission controller 12 judges whether or not pulley information is stored in the memory unit 28 in Step 300.

When the pulley information is stored, the process proceeds to Step 306, wherein a control of each section in a normal driving condition is performed. On the other hand, when the pulley information is not stored, the process proceeds to Step 301.

In Step 301, the transmission controller 12 issues an engine torque down command to an engine controller 19.

Thus, as shown in FIG. 4, the torque command value directed to the engine controller 19 by the transmission controller 12 at time t1 immediately after an ignition switch is on or threrafter, is 40 Nm, a command value in which it is impossible to drive a vehicle.

In Step 302, the transmission controller 12 directs to start an initialization operation of the step motor 27, which corrects a difference between a command value to the step motor 27 and an operating position of the step motor 27 to make the shift control valve travel at a position corresponding to a desired shift command value.

During the initialization operation of the step motor 27, the step motor 27 drives the shift control valve 25 to the direction of draining a hydraulic pressure in the primary pulley chamber 2C.

When the initialization operation of the step motor 27 is finished, the step motor 27 drives the shift control valve 25, and thereby the primary pulley pressure is increased from a time t2.

In Step 303, the transmission controller 12 determines whether or not the primary pulley pressure is above a predetermined value.

The predetermined value is set at, for instance, 0.3 MPa so that the primary pulley pressure ensures a belt capacity for preventing a belt slip.

A process of this step continues until the primary pulley pressure becomes above the predetermined value, and when the primary pulley pressure becomes above the predetermined value, then the process proceeds to Step 304.

In Step 304, the transmission controller 12 determines whether or not the condition determined in Step 303 in which the primary pulley pressure is above the predetermined value has continued for a predetermined time (for instance, 0.5 sec) or more.

When the condition has not continued for the predetermined time, the process of this step is continued, and on the other hand, when the condition has continued for the predetermined time, it is judged that the primary pulley pressure for preventing generation of a belt slip can be continuously supplied, and then the process proceeds to Step 305.

In Step 305 (time t4), the transmission controller 12 directs a torque command value high enough to ensure a normal power performance of a vehicle to the engine controller 19.

In this direction, the torque command value is, for example as shown in FIG. 4, increased with a predetermined gradient (20 Nm/sec) until reaching at 135 Nm after a time t4, and after reaching at 135 Nm, the torque command value is maintained at the value of 135 Nm.

It should be noted that a torque control of the engine to be performed in Step 305 when the pulley information is not stored in the memory unit 28, is finished if the pulley information is normally stored in the memory unit 28 when a power supply is turned on again, after an automobile dealer or the like finds and solves the problem of why the pulley information is not stored in the memory unit 28, or after a power supply of a vehicle is turned off.

In the preferred embodiment according to the present invention, the step motor 27 corresponds to a shift actuator. Further, Step 300 corresponds to a memory judgment section, and Step 304 corresponds to an elapsed-time judgment section. Steps 301 and 305 correspond to a torque restricting section.

The preferred embodiment of the present invention is formed as described above so that when the initialization operation of the step motor 27 is performed, an output torque of the engine is restricted if the pulley information is not stored in the memory unit 28 due to a defect of the backup power supply 29 or the like.

Even if the accelerator pedal is depressed during an initialization operation of the step motor 27 in which an adequate primary pulley pressure can not be ensured, the torque inputted to the V belt-type continuously variable transmission 1 is reduced to be small because of a restriction of the output torque of the engine 5 so that a slip of the V belt 4 between the pulley 2 and the pulley 3 is not generated.

After the initialization operation of the step motor 27, removing a torque restriction of the engine when a primary pulley pressure becomes above a predetermined value capable of ensuring a belt capacity, can improve an acceleration performance of a vehicle.

Moreover, when the condition in which the primary pulley pressure increasing after the initialization operation is above a predetermined value continues for a predetermined time or more, the transmission controller 12 removes the torque restriction of the engine and directs a torque command value capable of ensuring a normal power performance of a vehicle to the engine controller 19.

Thus, the transmission controller 12 can remove the torque restriction of the engine after it determines that a primary pulley pressure without generating a belt slip can be supplied to the primary pulley with certainty.

Furthermore, when the output torque restriction of the engine is removed, the torque command value is increased at a predetermined gradient, and when the torque command value reaches a predetermined torque value, the predetermined torque value is maintained, so that it is possible to prevent a sudden torque change resulting from the removal of the torque restriction of the engine, and thereby to prevent a belt slip.

The initialization operation of the step motor 27 is set to be performed when the engine is started, so that a difference between an operating position of the step motor 27 and a command value can be corrected as needed and a shift position(gear ratio) of the V belt-type continuously variable transmission 1 can be set accurately.

It should be noted that in the above-mentioned preferred embodiment of the present invention, a direct control of an output torque of the engine is described as an example, but this torque restriction may be performed by controlling an input torque to the primary pulley. That is, the control thereof may be performed by the torque converter interposed between the engine and the primary pulley, and furthermore, when a motor or a clutch is interposed between the engine and the primary pulley, the torque restriction described above may be performed by the motor or the clutch.

This application claims priority to Japanese Patent Application No.2004-108198. The entire disclosure of Japanese Patent Application No. 2004-108198 is hereby incorporated herein by reference.

While a selected embodiment has been only chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. An input torque control system of belt-type continuously variable transmission for vehicle, comprising:
    a primary pulley to which an input torque is inputted;
    a secondary pulley located on an output side of the transmission;
    a belt wound between the primary pulley and the secondary pulley; and
    a shift actuator to change a pressure difference between a primary pulley pressure exerting on the primary pulley and a secondary pulley pressure exerting on the secondary pulley respectively generated with a line pressure as an original pressure, thereby to change a gear ratio of the transmission, wherein:

the shift actuator is set in an operating position corresponding to a target gear ratio to change the pressure difference, so that a groove width of each of both the pulleys changes to cause an actual gear ratio obtained by a rotation ratio of the primary pulley to the secondary pulley to be the target gear ratio, the input torque control system further comprising:

a memory unit to store pulley information immediately before a stop of a vehicle;

a memory judgment section to judge whether or not the pulley information is stored in the memory unit;

a torque restricting section to restrict the input torque; and a primary pulley pressure sensor to detect the primary pulley pressure, wherein:

the torque restricting section restricts the input torque when the memory judgment section judges that the pulley information is not stored in the memory unit before an initialization operation of setting the shift actuator in a reference position is performed; and the torque restricting section removes the restriction of the input torque when the primary pulley pressure sensor detects that the primary pulley pressure is above a predetermined value after the initialization operation of the shift actuator is finished.

2. The input torque control system of belt-type continuously variable transmission for vehicle according to claim 1, further comprising:

an elapsed-time judgment section to judge whether or not a predetermined time has elapsed since the primary pulley pressure sensor detects that the primary pulley pressure is above a predetermined value, wherein:

the torque restricting section removes the restriction of the input torque when the primary pulley pressure above the predetermined value is detected by the primary pulley pressure sensor and the primary pulley pressure above the predetermined value has continued for more than the predetermined time judged by the elapsed-time judgment section.

3. The input torque control system of belt-type continuously variable transmission for vehicle according to claim 1, wherein:

a removal of the restriction of the input torque by the torque restricting section is performed by such a way that a torque command value is increased at a predetermined gradient from a torque command value in which the input torque is restricted, and after the increased torque command value reaches a predetermined torque command value, the predetermined torque command value is maintained.

4. The input torque control system of belt-type continuously variable transmission for vehicle according to claim 1, wherein;

the pulley information includes at least one of a gear ratio of the belt-type continuously variable transmission and an operating position of the shift actuator.

5. The input torque control system of belt-type continuously variable transmission for vehicle according to claim 1, wherein;

the input torque to the primary pulley is an output torque of an engine.

6. The input torque control system of belt-type continuously variable transmission for vehicle according to claim 5, wherein;

the initialization operation of the shift actuator is performed when the engine is started.

* * * * *